Feb. 21, 1961  P. E. BIEMILLER ET AL  2,972,745
ELECTRIC WRIST WATCH

Filed April 17, 1956  4 Sheets-Sheet 1

INVENTOR
Philip E. Biemiller
James H. Reese

BY  *m̄w̄ Gould*

ATTORNEY

Feb. 21, 1961 P. E. BIEMILLER ET AL 2,972,745
ELECTRIC WRIST WATCH
Filed April 17, 1956 4 Sheets-Sheet 2

INVENTOR
Philip E. Biemiller
James H. Reese
BY
ATTORNEY

United States Patent Office 2,972,745
Patented Feb. 21, 1961

2,972,745
ELECTRIC WRIST WATCH

Philip E. Biemiller, Landisville, and James H. Reese, Manheim, Pa., assignors to Hamilton Watch Company, Lancaster, Pa., a corporation of Pennsylvania Filed Apr. 17, 1956, Ser. No. 578,843

4 Claims. (Cl. 58—28)

This invention relates to an electric wrist watch and more particularly relates to an electric watch wherein the balance wheel serves as the frequency controlling element and also supplies the mechanical energy to the gear train.

The limited space within the case of a wrist watch imposes stringent limitations upon both the primary electric source and the means for converting the electrical energy into mechanical energy. Further, it is obvious that the amount of electrochemical energy which can be built into a watch size battery is limited. This requires that the available electrical energy be converted into mechanical energy as efficiently as possible so that an extended battery life can be obtained. The component parts of the electric wrist watch, including the battery, the oscillating frequency controlling element, the magnets maintaining the permanent magnetic field and the mechanical movement, must be kept to a minimum size. While many attempts have been made to solve this problem satisfactorily, we are not aware that any electric wrist watch has ever been successfully marketed.

Certain types of electric motors for converting electrical energy to mechanical energy in electric timepieces heretofore proposed have been both of the moving coil and stationary coil type and have used stationary or movable permanent magnets of various shapes. Previously, the magnets have been formed more or less elongated and in certain constructions shunts or keepers have been used. In still other constructions due to space limitations the magnets have been bent into U-shapes. The apparent reason for using magnets of this elongated shape was that they produce a strong field and it is well known that good motor operation calls for a high magnetic field. Prior workers, including applicants, have heretofore believed that this required the use of magnets selected on the basis of residual induction with only secondary consideration being given to other magnet characteristics. When magnets are selected on this basis a high length to diameter ratio is generally required.

While this type of design may be feasible in clocks, we have found that certain problems become acute when similar designs are used for electric wrist watches. Basically, these problems are aggravated because of the stringent space limitations in a wrist watch. Measurements on several watch models having magnetic circuits designed on this basis have shown that extensive flux leakage exists which deleteriously affects other watch components. Attempts to control or limit the flux leakage resulted in low efficiency motors. Stray magnetic fields are detrimental in that they affect steel parts within the watch, and this makes it necessary to provide non-magnetic balance staffs to prevent a magnetic influence which will alter the isochronical behavior of the frequency controlling element. Magnetic fields also affect hairsprings since the temperature compensating characteristic essential to quality timepieces is presently achieved by resort to magnetic materials in the hairspring. A low efficiency motor results in a short battery life. Thus, with this type magnetic circuit any compromise leads to an electric wrist watch which will prove less than satisfactory.

We have now discovered that these problems of adequate flux density, stray fields and size may be effectively minimized through the use of magnets and magnetic circuits of certain specific shapes and magnetic materials. We have thus found that marked advantages may be obtained by discarding the conventional elongated bent or unbent magnets heretofore utilized and replacing these with short cylindrical magnets having a length to diameter ratio of substantially no greater than one. We have also found that particular types of shunt circuits are effective in reducing leakage flux and in producing a maximum uniform flux density in an isolated air gap. With leakage flux thus greatly reduced because of both the magnet size and circuitry, it is even possible to use conventional steel alloys for the balance staff without interfering with the timekeeping of the watch since isochronal characteristics of the balance unit are greatly improved.

It is, accordingly, a primary object of the present invention to provide an electric wrist watch operating from a self-contained battery and having a high efficiency of conversion of electrical to mechanical enrgy.

It is another object of the invention to provide an electric watch including a small but powerful source of permanent magnetism arranged in a magnetic circuit which provides a maximum uniform flux density in the air gap but which minimizes stray fields.

It is another object of the invention to provide an electric watch containing small magnets having a length to diameter ratio of not greater than one.

It is another object of the invention to provide an electric watch having a magnetic shunt circuit which minimizes leakage field.

A further object of the present invention is to use permanent magnets of a material having a combination of characteristics which include a moderately high flux density, a coercive force sufficient to prevent demagnetization through exposure to normal demagnetizing fields, and an energy product which reaches its approximate maximum point when the magnetic material is made into magnets having a length to diameter ratio of not greater than one.

It is a still further object of the present invention to provide magnets in an electric wrist watch, said magnets having a length to diameter ratio of not greater than one and having at this physical size and shape a residual induction, a coercive force and an energy product of magnitude sufficient to permit the construction of a watch motor whose operation requires average input power of about 10 microwatts.

It is a still further object of the invention to provide a magnetic field at right angles to the path of movement of a periodically energized oscillating coil, said field to be created by magnets formed substantially cylindrical in shape and having a length to diameter ratio of not greater than one with a diameter of substantially $\frac{1}{10}$ of an inch and characterized by a residual induction, a coercive force and an energy product sufficient to produce a motor operating on an average input power of about 10 microwatts and to prevent demagnetization under exposure to normal demagnetizing fields.

These and further objects and advantages of the invention will become apparent upon reference to the following specification and claims and appended drawings wherein:

In creating a permanent magnetic field for use in electrically operated timepieces it has been customary to utilize magnets whose length is relatively large compared to the diameter or width. Generally, these magnets have been bent into various configurations so as to fit within the watch case and still produce the desired flux density in the air gap. While the patent literature is for the most part silent as to the specific magnetic materials utilized, the magnet shapes used would seen to indicate that it was thought desirable to use magnetic materials having a high residual induction. According to our invention, we have found that, with wrist watches, markedly better operation may be achieved through the use of magnets having a low length to diameter ratio made of materials having a combination of magnetic characteristics which may include a lower residual induction but a correspondingly higher coercive force, particularly when the combination of the characteristics are such that a maximum energy product is obtained for magnets having a length to diameter ratio not greater than one.

Figure 4:
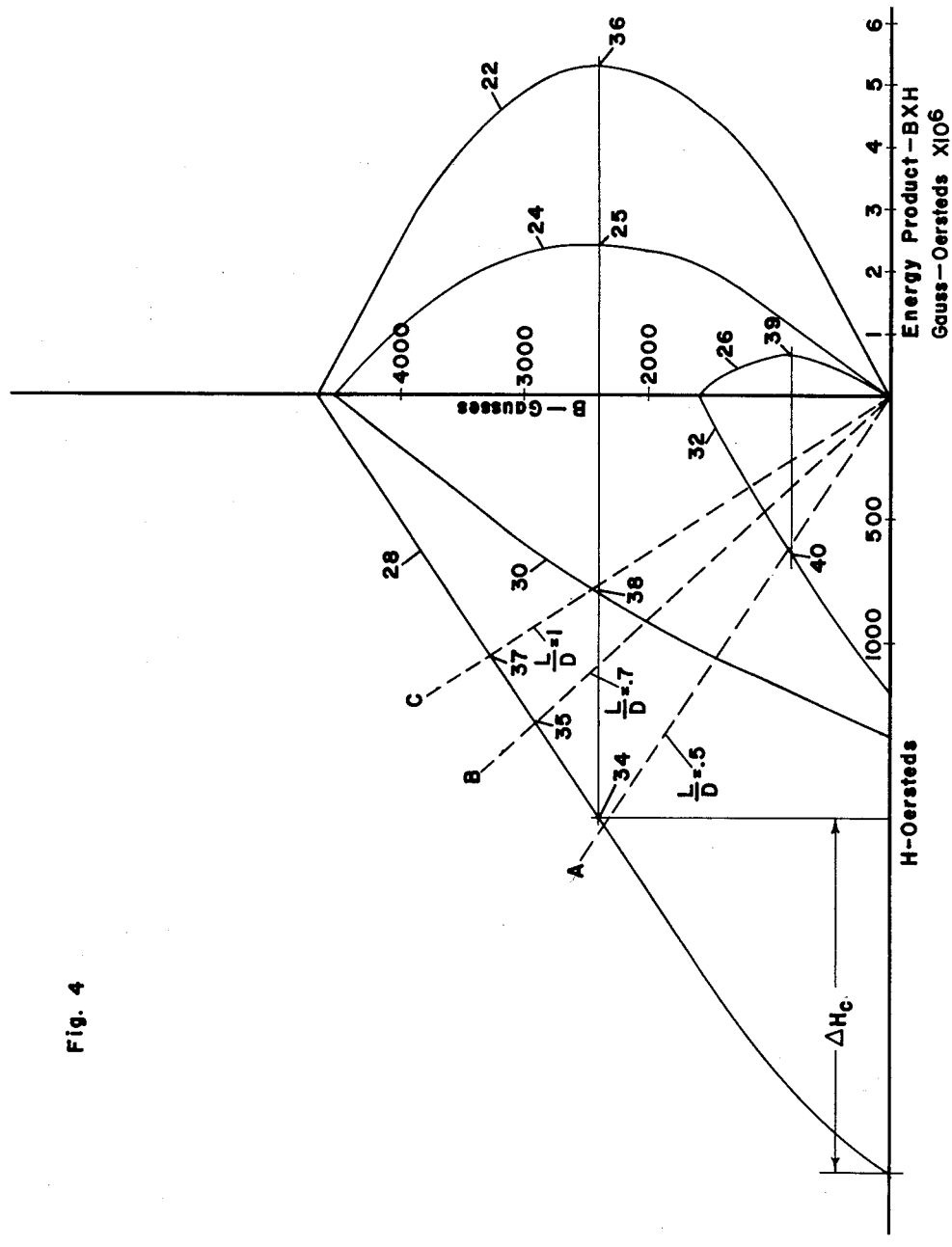
Figure 4 is a graph showing the characteristics of the magnets utilized in the watch.

Referring to Figure 4, there are shown a series of energy product curves and demagnetization curves for a number of different magnetic materials. The ordinate represents B or the flux density in gausses. The abscissa to the left of the ordinate represents the demagnetizing force or applied field H in oersteds and the abscissa to the right of the ordinate represents the product of the corresponding values of B and H for any given point on the demagnetization curve and is a graphical representation of the variation of available potential energy which the magnet can furnish for external use at the various operating flux densities. If a specific permanent magnet material is to be used for a specific application which requires a minimum volume, the design factors must be so controlled that the magnet operates substantially at a point corresponding to the maximum in the energy product curve.

Figure 5:
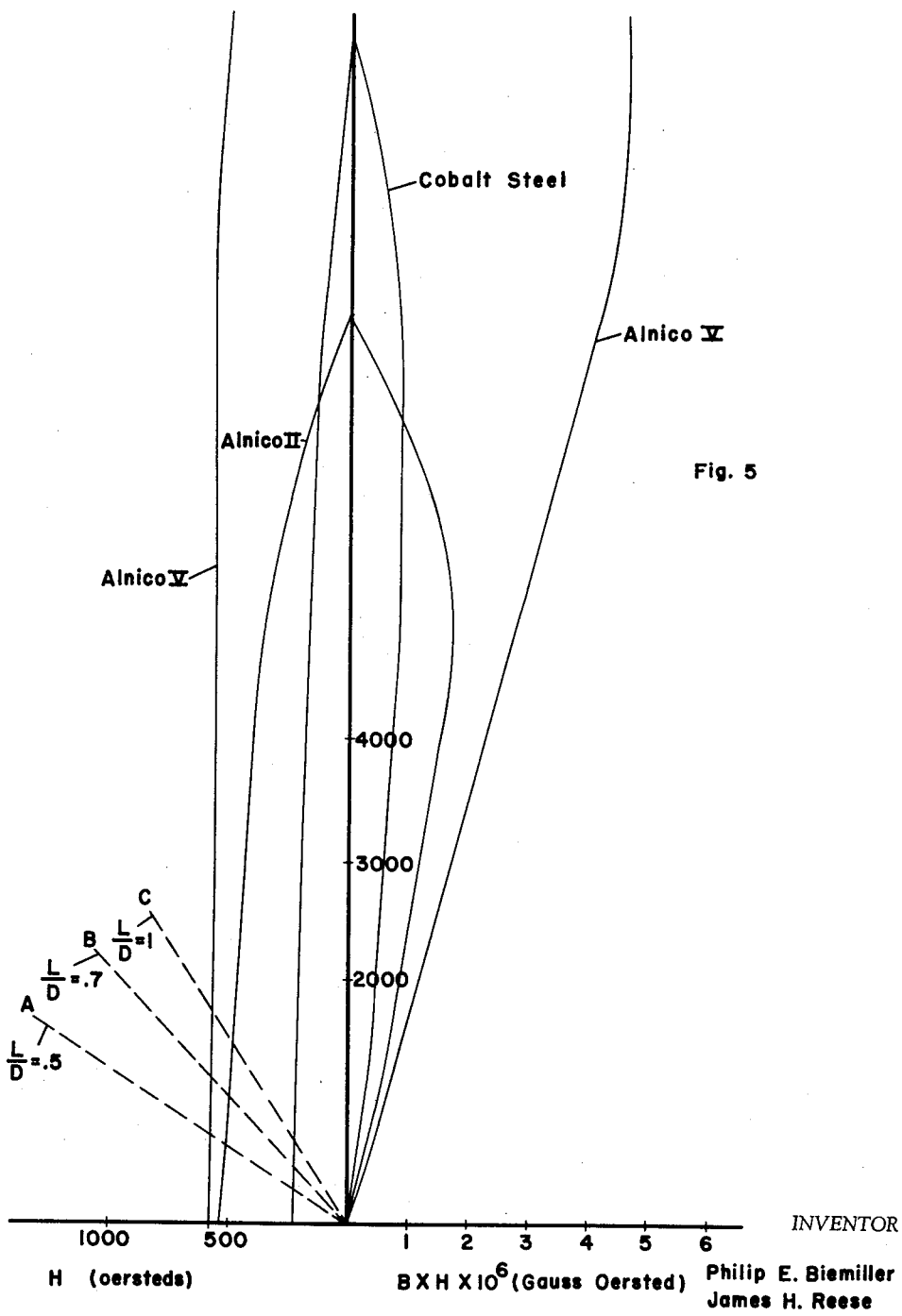
Figure 5 is a graph showing the magnetic characteristics of alloys which, while having greater or lesser values than those shown in Figure 4, are unsuitable for use in the watch.

Figures 4 and 5 represent the demagnetization and energy product curves for two groups of magnetic materials. The broken lines A, B, and C in Figures 4 and 5 are construction lines whose slopes are related to the physical size of a magnet without pole pieces, particularly to the ratio of length to diameter and respectively represent length to diameter ratios of 0.5, 0.7, and 1.0.

Where an Alnico V magnet is designed to operate at its maximum energy product, the length to diameter ratio is approximately 5 and this is representative of the type of material which has been used heretofore. An Alnico V magnet having a length to diameter ratio of 5 and a cross-sectional area necessary to provide the requisite flux would occupy an excessively large proportion of the space available within the case of a wrist watch. Maintaining the same cross-sectional area and reducing the length to diameter to not greater than one would reduce the magnetic flux density and would cause the magnet to operate so far below the knee of the demagnetization curve that it would require but a relatively small demagnetizing force to completely de-energize the magnet. These magnetic characteristics make this material impractical for use in a wrist watch.

Similar curves are shown for cobalt steel and a material sold under the trade name, Alnico II. For the reasons set forth for Alnico V it is obvious that these materials are also less than satisfactory for use in a wrist watch.

If any of these or similar magnetic materials were to be formed into a magnet having a length to diameter ratio of less than one, the available flux density would be insufficient to permit operation of the watch for an extended period on a miniature primary cell. In addition, such magnets would be operating so far below the knee of the demagnetization curve that the stability of the flux density in the air gap would be limited to the extent that a very small demagnetizing force would render the watch inoperative.

Thus, magnets made of this material with a length to diameter ratio of not greater than one have not proved functional. If the length to diameter ratio is increased to that required by the characteristics of the material for practical magnet operation, the space limitations imposed by the size of a wrist watch makes these materials impractical. In addition to the space limitations, larger magnets create more intense and widespread stray magnetic fields which seriously affect the frequency controlling element and the associated gear trains since these normally contain components of magnetic material.

We have found that magnetic characteristics required for a highly specialized application such as an electric wrist watch cannot be definitely expressed by any one particular feature of the alloy but must show a combination of flux density, energy product and coercive force when used as a magnet with a length to diameter ratio of not greater than one in order to be practical to supply the field required where the electrical energy which can be utilized is of necessity very small. According to our construction, we have found that in wrist watch dimensions a much higher quality watch operation may be achieved through the use of low length to diameter ratio cylindrical magnets having a residual induction which is lower than that which previous magnet shapes indicate was thought most desirable. The term cylindrical is here used in its broad geometrical sense and is not intended to mean only right circular cylinders, although magnets of this shape constitute a preferred embodiment.

There are a number of magnetic materials which meet our low length to diameter ratio requirements. Magnetic characteristic curves for some of these materials such as cobalt-platinum, iron-platinum and $Ba.6Fe_2O_3$ magnets (sold under the trade name Index I) are shown in Figure 4. The energy product curve for a cobalt-platinum alloy is shown to the right of the ordinate at 22, with the maximum energy product point at 36. The demagnetization curve 28 for cobalt-platinum is shown to the left of the ordinate and the coercive force is indicated at intersection of said curve with the abscissa. The broken lines A, B, and C emanating from the origin intersect the demagnetization curve at points 34, 35, and 37 respectively. The intersection 34 of the line A with the demagnetization curve indicates the operating point for a magnet (without pole pieces) having a length to diameter ratio of 0.5. A projection from this point to the energy product curve indicates that a magnet of such dimensions will operate at approximately the point 36 of maximum energy product. Projecting the point 34 to the abscissa shows that a large demagnetizing force $\Delta H_c$ would be necessary to de-energize the magnet. This is particularly important since a wrist watch may be exposed to electrical equipment producing alternating magnetic fields which could demagnetize inferior magnets and render the watch inoperative or at least very unstable.

The energy product curve 24 and the demagnetization curve 30 show the characteristics of an iron-platinum alloy. The point 38, the intersection of the demagnetization curve with the line C representing the load line of a magnet having an $L/d$ ratio of one, may be projected to the point 25 indicating a maximum energy product and to the abscissa showing that a large demagnetizing force would be needed to de-energize the magnet.

Similarly, Index I is shown on the curves 26 and 32 in which again the selection of a length to diameter of no greater than one indicates the material will operate at a maximum energy product at 39 and will require a large demagnetizing force.

It is obvious that the magnetic characteristics vary considerably especially between Index I and the cobalt-platinum alloy. Nevertheless, by making slight changes in the associated oscillating coil and the magnet cross section (still maintaining a length to diameter ratio of not greater than one), a practical electric wrist watch can be built. Other magnetic materials having similar characteristics can be used satisfactorily. We have found that a satisfactory magnetic material must have a coercive force of not less than approximately 750 oersteds in order to provide a stable air gap flux density for watch use. In order to obtain the desired high air gap flux density, the flux density at the center of the magnet should be about 1000 gausses. While these magnets are preferably the shape of a right circular cylinder, it will be understood that other cylindrical shapes such as hexagons, octagons, etc. may be used, and that in these cases the length to diameter ratio may be calculated by dividing the length of the magnet by the diameter of a circle having an equivalent cross-sectional area, as shown in the following equation:

$$L/d = \frac{\text{length}}{2\sqrt{\text{area}/\pi}}$$

Figure 1:
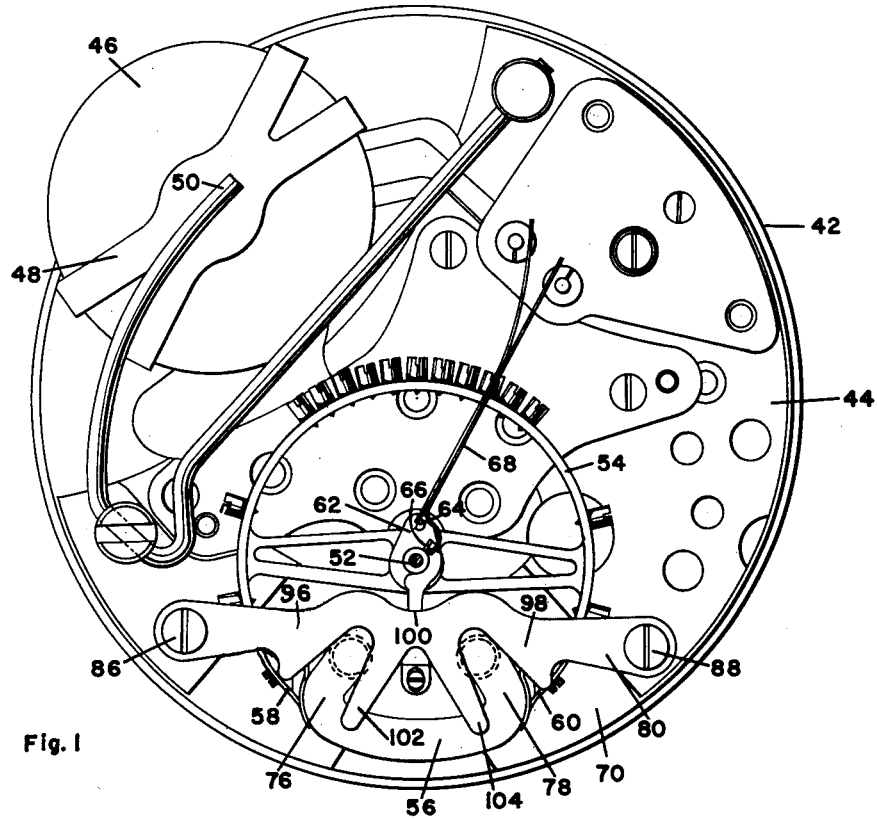
Figure 1 is a plan view of the train side of an electric watch, with the balance cock removed, constructed according to the invention.
Figure 2:
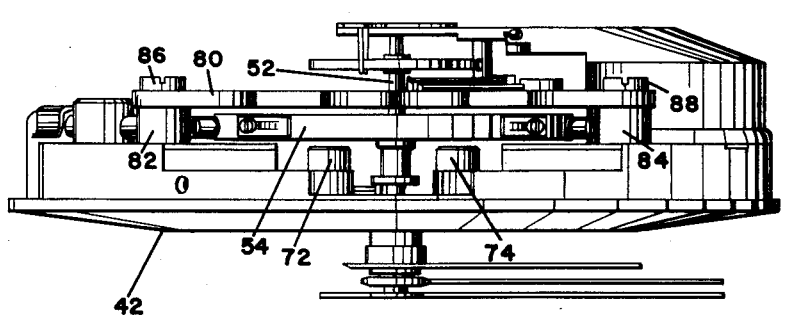
Figure 2 is a vertical elevation of the watch of Figure 1 with the battery removed.
Figure 3:
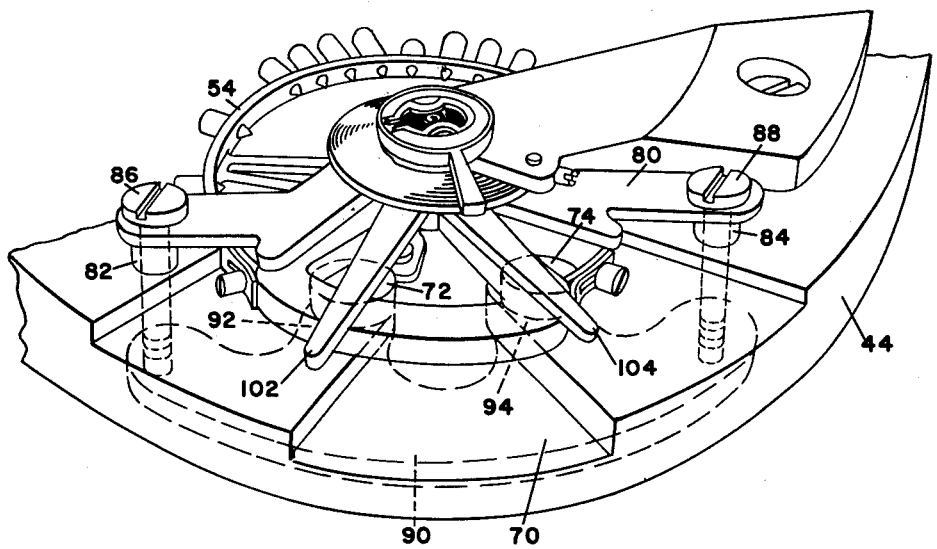
Figure 3 is a perspective view of the magnet mounting assembly of the watch of Figures 1 and 2.

Referring to Figures 1 through 3, there is seen an electric watch 42 constructed according to our invention. The watch 42, as seen from the train side in Figure 1, comprises a pillar plate 44 which supports a battery 46 held in place by means of a clip 48 and spring 50. The balance staff 52 carries a balance wheel 54 having a sector shaped coil 56 secured to the rim of said wheel by means of clamps 58 and 60. A roller table 62 is carried on the balance staff 52 above the balance wheel 54 and carries a pin 64 and contact 66 for making periodic electrical contact with the contact spring arm assembly 68 which is connected to one terminal of the battery 46. Further details of the specific contact system may be found in assignee's copending application Serial No. 551,791, filed December 8, 1955.

Referring to Figure 3, the pillar plate 44 is provided with a sector shaped slot 70 under the balance wheel 54 and adjacent to the inner portion of this slot the pillar plate is apertured to receive a pair of cylindrical magnets 72 and 74 which are press fitted therein and which have a length to diameter ratio of no more than one. The magnetic flux, of course, emanates from the ends of the magnet perpendicular to the areas involved. The location of these magnets is such that one magnet lies beneath each side 76 and 78 of the sector shaped coil 56, the magnets being placed so that opposite polarities are uppermost in magnets 72 and 74 respectively. In a preferred embodiment the diameter of magnets 72 and 74 is equal to substantially twice the width of the coil 56. An upper shunt 80 is supported by a pair of pillars 82 and 84 of soft magnetic material which extend through the pillar plate 44. Screws 86 and 88 pass through the upper shunt and pillars 82 and 84 and engage the lower shunt 90 which is thus held against the bottom of the pillar plate. The pillar plate 44 is formed of a suitably nonmagnetic material such as brass or nickel silver, while the shunts 80 and 90 and pillars 82 and 84 are formed of a magnetic material such as low carbon steel. The screws 86 and 88 may be of either a magnetic or a nonmagnetic material.

The lower shunt 90 is generally arcuate in shape and has a pair of radially inwardly extending projections 92 and 94 which extend under and into contact with the lower faces of the magnets 72 and 74. The upper shunt 80 is in the general form of a flattened M having outer legs 96 and 98 and an inner shallow V-shaped portion 100. Projecting from the lower surface of the shallow V-portion 100, as seen in Figure 1, are a pair of inverted V-disposed fingers 102 and 104.

Referring to Figure 1, it will be seen that neither legs 96 and 98 nor fingers 102 and 104 directly overlie the upper surfaces of the magnets 72 and 74, the legs 96 and 98 extending to the outside of the magnets and the fingers 102 and 104 extending to the inside of the magnets. It will be noted that except for the ends of the upper shunt 80, which are fastened to pillars 82 and 84, and except for the very tips of the fingers 102 and 104, the upper shunt does not substantially overlie the lower shunt 90. While the exact magnetic theory is not completely understood at this time, it has been found that this particular configuration coupled with the shape and size of the magnets results in a minimum of stray magnetic fields within the watch and provides a maximum flux density through each of the sides 76 and 78 of the coil 56.

When using the cylindrical magnets of this invention having a length to diameter ratio no greater than one, it is possible to place the magnets themselves in the precise position in the watch where the maximum flux density is desired. The longitudinal axes of the magnets are parallel to the axis of the balance staff and perpendicular to the plane of the balance wheel. The magnets are permanently mounted within the pillar plate, thereby preventing removal of the magnets and their loss or reinsertion in an improper magnetic relationship. A further advantage is that substantial portions of the magnets are completely encased in the pillar plate so that it is physically impossible to approach these portions with other magnetic material which might deleteriously affect their residual magnetism. The shape of the magnets, combined with the particular shunt circuit utilized, results in a leakage flux which is inconsequential in practice. If the leakage flux were sufficiently high it would be necessary to use a balance staff of nonmagnetic material. We have found that most nonmagnetic alloys having otherwise desirable physical characteristics are difficult to machine and do not have the wear resistance properties required of balance staffs. On the above disclosed magnetic circuit the magnetic leakage flux is small enough to permit the use of an ordinary steel balance staff. Other advantages of this low leakage are that the assembly of steel parts is less troublesome, there is no danger of an electric watch accidentally magnetizing nearby mechanical watches, and steel pinions no longer become magnetized to create gear train interference. With this circuit the temperature compensation of the hairspring is approximately equivalent to that of conventional wrist watches and fabrication and assembly of the electric wrist watch is simplified. That is to say, after heat treatment and magnetization, the magnets are permanently pressed into the pillar plate and are not susceptible to reassembly in an improper polarity relationship. The watch is antimagnetic with respect to external magnetic fields and will continue to run and keep time in magnetic fields much larger than those which stop most watches commonly designated as antimagnetic. In the event of accidental magnetization of the balance staff or hairspring, the entire watch can be "demagnetized" by normal methods without any effect on the watch magnets or magnetic circuit. That is to say, close proximity to large permanent magnets produces no permanent damage to the watch.

It will be apparent from the foregoing that we have provided an electric wrist watch wherein electrical energy is efficiently transformed into mechanical energy and wherein stray magnetic fields are practically eliminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing descrip-

What is claimed and desired to be secured by United States Letters Patent is:

1. In an electric watch having a train and a source of motive power for said train including a balance and hairspring assembly comprising, coil means carried by said balance and having two spaced portions extending substantially radially to the axis of said balance, and means establishing spaced concentrated magnetic fields through said radial coil portions, said fields being oriented substantially parallel to the axis of said balance and created by small cylindrical magnets having a length to diameter ratio of approximately 0.5–1.0, a coercive force of no less than 750 oersteds, a flux density at the center of the magnets of no less than 1000 gausses, and a maximum energy product at that length to diameter ratio.

2. In an electric watch having a train and a souce of motive power for said train including a balance and hairspring assembly comprising, a coil carried by said balance and having two spaced portions extending substantially radially to the axis of said balance less than 180° apart about said axis, and means establishing spaced concentrated magnetic fields through said radial coil portions, said fields being oriented substantially parallel to the axis of said balance and created by small cylindrical magnets having a length to diameter ratio of approximately 0.5–1.0 a coercive force of no less than 750 oersteds, a flux density at the center of the magnets of no less than 1000 gausses, and a maximum energy product at that length to diameter ratio.

3. In an electric watch having a train and a source of motive power for said train including a balance and hairspring assembly comprising, a coil carried eccentric of said balance and having two spaced portions extending substantially radially to the axis of said balance less than 180° apart about said axis, and means establishing spaced concentrated magnetic fields through said radial coil portions, said fields being oriented substantially parallel to the axis of said balance and created by small cylindrical magnets having a length to diameter ratio of approximately 0.5–1.0, a coercive force of no less than 750 oersteds, a flux density at the center of the magnets of no less than 1000 gausses, and a maximum energy product at that length to diameter ratio.

4. A device as set out in claim 1 wherein said magnets are formed of cobalt-platinum.

References Cited in the file of this patent

UNITED STATES PATENTS

| | | |
|---|---|---|
| 1,755,649 | Holden | Apr. 22, 1930 |
| 1,911,062 | Conrad | May 23, 1933 |
| 2,245,268 | Goss et al. | June 10, 1941 |
| 2,598,912 | Held | June 3, 1952 |
| 2,698,917 | Van Urk et al. | Jan. 4, 1955 |
| 2,883,827 | Ensign et al. | Apr. 28, 1959 |

OTHER REFERENCES

Publications—

"Permanent Magnet Design Manual," a booklet published by G. E. Co. in March 1949.

"Permanent Magnet Manual No. 2," a booklet published by Indiana Steel Products Company.